US010494030B1

(12) United States Patent
Paramasivam et al.

(10) Patent No.: US 10,494,030 B1
(45) Date of Patent: Dec. 3, 2019

(54) COLLAPSIBLE BATTERY PACK SUPPORT ASSEMBLY AND SUPPORTING METHOD

(71) Applicant: Ford Global Technologies, LLC, Dearborn, MI (US)

(72) Inventors: Saravanan Paramasivam, South Lyon, MI (US); Dave Moschet, Dearborn, MI (US); Daniel Miller, Dearborn, MI (US); Hari Krishna Addanki, Novi, MI (US); Amar Marpu, Canton, MI (US); Rajaram Subramanian, Ann Arbor, MI (US); Kimberley King, Northville, MI (US); Kanchana Perumalla, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/105,352

(22) Filed: Aug. 20, 2018

(51) Int. Cl.
*B62D 21/15* (2006.01)
*B60K 6/22* (2007.10)
*B60K 1/04* (2019.01)
*B62D 25/02* (2006.01)
*B60L 50/60* (2019.01)

(52) U.S. Cl.
CPC ............. *B62D 21/157* (2013.01); *B60K 1/04* (2013.01); *B60K 6/22* (2013.01); *B60L 50/66* (2019.02); *B62D 25/025* (2013.01); *B60K 2001/0438* (2013.01); *B60Y 2200/91* (2013.01); *B60Y 2200/92* (2013.01)

(58) Field of Classification Search
CPC ...................... B60K 2001/0438; B62D 21/157

USPC ..................................... 180/68.5; 296/187.08
See application file for complete search history.

(56) References Cited

U.S. PATENT DOCUMENTS

| 4,292,782 | A * | 10/1981 | Schaeffer | E04C 3/07 52/696 |
| 4,848,835 | A * | 7/1989 | DeRees | B62D 21/02 296/204 |
| 6,227,322 | B1 * | 5/2001 | Nishikawa | B60R 16/04 180/65.1 |
| 6,296,300 | B1 * | 10/2001 | Sato | B62D 21/152 296/187.08 |
| 6,676,200 | B1 * | 1/2004 | Peng | B62D 21/157 296/187.08 |
| 6,705,668 | B1 * | 3/2004 | Makita | B62D 21/15 296/187.03 |

(Continued)

FOREIGN PATENT DOCUMENTS

JP H07117490 5/1995

*Primary Examiner* — Jeffrey J Restifo
(74) *Attorney, Agent, or Firm* — David Kelley; Carlson, Gaskey & Olds, P.C.

(57) ABSTRACT

An exemplary support assembly includes, among other things, a hoop bracket coupling a battery pack to a vehicle body structure, and a tuned bracket within an open area of the hoop bracket. The tuned bracket is configured to control a collapse of the hoop bracket in response to a load above a threshold level to reduce a transfer of the load to the battery pack. An exemplary supporting method includes coupling a battery pack to a vehicle body structure using a hoop bracket disposed alongside the battery pack. The hoop bracket includes an open area that receives a tuned bracket. The tuned bracket is configured to control a deformation of the hoop bracket in response to a load above a threshold level to reduce a transfer of the load to the battery pack.

19 Claims, 3 Drawing Sheets

(56) References Cited

U.S. PATENT DOCUMENTS

| | | | | |
|---|---|---|---|---|
| 7,118,170 B2* | 10/2006 | Montanvert | B62D 21/157 | 296/209 |
| 7,695,056 B2* | 4/2010 | Hanson, Jr. | B62D 21/157 | 296/187.08 |
| 8,210,301 B2* | 7/2012 | Hashimoto | B60K 1/04 | 180/68.5 |
| 8,608,230 B2* | 12/2013 | Young | B60K 1/04 | 296/187.02 |
| 8,689,919 B2* | 4/2014 | Maeda | B62D 21/157 | 180/311 |
| 8,696,051 B2* | 4/2014 | Charbonneau | B62D 21/157 | 296/187.12 |
| 8,708,402 B2* | 4/2014 | Saeki | B60K 1/04 | 180/68.5 |
| 8,739,909 B2* | 6/2014 | Hashimoto | H01M 2/1083 | 180/68.5 |
| 8,833,499 B2* | 9/2014 | Rawlinson | F41H 7/042 | 180/68.5 |
| 8,833,839 B2* | 9/2014 | Young | B62D 21/157 | 296/187.12 |
| 8,863,877 B2* | 10/2014 | Saeki | B60K 1/04 | 180/271 |
| 8,936,125 B2* | 1/2015 | Nakamori | B60K 1/04 | 180/68.5 |
| 8,939,246 B2* | 1/2015 | Yamaguchi | B60K 1/04 | 180/68.5 |
| 8,967,698 B2* | 3/2015 | Werum | B62D 21/152 | 280/751 |
| 9,022,152 B2* | 5/2015 | Imamura | B62D 21/157 | 180/68.5 |
| 9,027,684 B2* | 5/2015 | Araki | B60K 1/04 | 180/311 |
| 9,034,502 B2* | 5/2015 | Kano | B60K 1/04 | 429/99 |
| 9,045,030 B2* | 6/2015 | Rawlinson | B60K 1/04 | |
| 9,281,505 B2* | 3/2016 | Hihara | B60K 1/04 | |
| 9,493,190 B1* | 11/2016 | Alwan | B62D 21/157 | |
| 9,505,442 B2* | 11/2016 | Wu | B62D 21/157 | |
| 9,517,687 B2* | 12/2016 | Nakajima | B60K 1/04 | |
| 9,545,952 B2* | 1/2017 | Sakaguchi | B62D 21/157 | |
| 9,618,074 B2* | 4/2017 | Kaneko | B62D 21/157 | |
| 9,623,742 B2* | 4/2017 | Ikeda | B60K 1/04 | |
| 9,656,571 B2* | 5/2017 | Nusier | B60L 11/1879 | |
| 9,673,433 B1* | 6/2017 | Pullalarevu | H01M 2/1083 | |
| 9,758,029 B2* | 9/2017 | Hokazono | B60K 1/04 | |
| 9,796,424 B2* | 10/2017 | Sakaguchi | B60K 1/04 | |
| 9,809,100 B2* | 11/2017 | Kamimura | B62D 25/2036 | |
| 9,809,101 B2* | 11/2017 | Ikeda | B62D 29/001 | |
| 9,821,854 B2* | 11/2017 | Bach | B62D 25/025 | |
| 10,029,734 B2* | 7/2018 | Akhlaque-e-rasul | B62D 27/026 | |
| 10,035,544 B2* | 7/2018 | Lee | B62D 21/157 | |
| 10,053,152 B2* | 8/2018 | Kellner | B62D 21/15 | |
| 10,099,725 B2* | 10/2018 | Ishii | B62D 25/02 | |
| 2007/0052260 A1 | 3/2007 | Lassl et al. | | |
| 2007/0152474 A1 | 7/2007 | Lassl et al. | | |
| 2017/0084890 A1 | 3/2017 | Subramanian et al. | | |

\* cited by examiner

COLLAPSIBLE BATTERY PACK SUPPORT ASSEMBLY AND SUPPORTING METHOD

TECHNICAL FIELD

This disclosure relates generally to a supporting a battery pack and, more particularly, to a support assembly that supports a battery pack along an underbody of an electrified vehicle.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain for an electrified vehicle can include a high-voltage battery pack having battery cells that store electric power for powering the electric machines and other electrical loads of the electrified vehicle.

The battery pack can be secured to an underbody, or another area, of an electrified vehicle. Different electrified vehicles can have different packaging envelopes available to accommodate a battery pack.

SUMMARY

A support assembly according to an exemplary aspect of the present disclosure includes, among other things, a hoop bracket coupling a battery pack to a vehicle body structure, and a tuned bracket within an open area of the hoop bracket. The tuned bracket is configured to control a collapse of the hoop bracket in response to a load above a threshold level to reduce a transfer of the load to the battery pack.

In another example of the foregoing support assembly, the tuned bracket extends from an outboard side of the hoop bracket to an inboard side of hoop bracket.

Another example of any of the foregoing support assemblies includes a forward side of the hoop bracket that tapers rearward from the outboard side to the inboard side, and a rear side of the hoop bracket that tapers forward from the outboard side to the inboard side.

Another example of any of the foregoing support assemblies includes a forward side of the hoop bracket and a rear side of the hoop bracket. The forward and rearward sides both taper forward from the outboard side to the inboard side or both taper rearward from the outboard side to the inboard side.

In another example of any of the foregoing support assemblies, the tuned bracket has a triangular profile.

In another example of any of the foregoing support assemblies, the hoop bracket extends circumferentially continuously about the open area.

In another example of any of the foregoing support assemblies, the hoop bracket extends circumferentially about a vertically extending axis.

Another example of any of the foregoing support assemblies includes a forward brace interfacing with a forward end portion of the hoop bracket, and a rear brace interfacing with a rear end portion of the hoop bracket. The forward and rear braces are configured to limit forward and rearward movement of the hoop bracket when the load is applied.

In another example of any of the foregoing support assemblies, the forward brace and the rear brace are each cylindrical.

Another example of any of the foregoing support assemblies includes a vehicle rocker as the vehicle body structure.

In another example of any of the foregoing support assemblies, the hoop bracket and the tuned bracket are a first hoop bracket and a first tuned bracket on a driver side of the battery pack, and the assembly further includes a second tuned bracket within an open area of a second hoop bracket on a passenger side of the battery pack. The second tuned bracket is configured to collapse in response to a load above a threshold level to reduce a transfer of the load to the battery pack.

Another example of any of the foregoing support assemblies includes the battery pack having a plurality of structural cross-members distributed along a longitudinal axis of a vehicle having the battery pack. One of the structural cross-members extends longitudinally between the first hoop bracket and the second hoop bracket such that a path of the load extends through the first hoop bracket, through the one of the structural cross-members, and through the second hoop brackets.

A supporting method according to another exemplary aspect of the present disclosure includes coupling a battery pack to a vehicle body structure using a hoop bracket disposed alongside the battery pack. The hoop bracket includes an open area that receives a tuned bracket. The tuned bracket is configured to control a deformation of the hoop bracket in response to a load above a threshold level to reduce a transfer of the load to the battery pack.

In another example of the foregoing method, the tuned bracket extends from an outboard side of the hoop bracket to an inboard side of hoop bracket.

In another example of the any of the foregoing methods, the hoop bracket extends circumferentially continuously about the open area.

In another example of any of the foregoing methods, the hoop bracket extends circumferentially about a vertically extending axis.

In another example of any of the foregoing methods, the hoop bracket and the tuned bracket are configured such that when the hoop bracket deforms, some of the load is redirected along a longitudinal axis of a vehicle having the battery pack.

In another example of any of the foregoing methods, the hoop bracket and the tuned bracket are a first hoop bracket and first tuned bracket on a driver side of the vehicle. The method further includes coupling the battery pack to another vehicle body structure using a second hoop bracket disposed on a passenger side of the battery pack. The second hoop bracket includes an open area that receives a second tuned bracket. The second tuned bracket is configured to control a deformation of the hoop bracket in response to a load above a threshold level to reduce a transfer of the load to the battery pack.

Another example of any of the foregoing methods includes applying the load to the driver side of the vehicle to collapse both the first hoop bracket and the second hoop bracket.

In another example of any of the foregoing support assemblies, the load is 5 kilonewtons or more.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to absorbing loads applied to an electrified vehicle. More particularly, the disclosure relates to absorbing side loads applied to the electrified vehicle.

Figure 1:
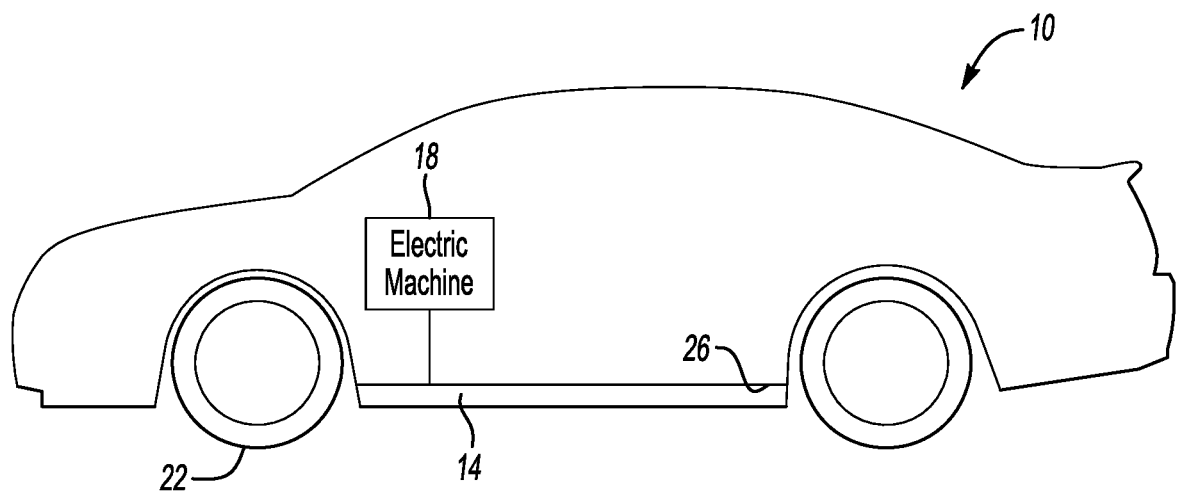
FIG. 1 shows a schematic side view of an example electrified vehicle.
Figure 2:
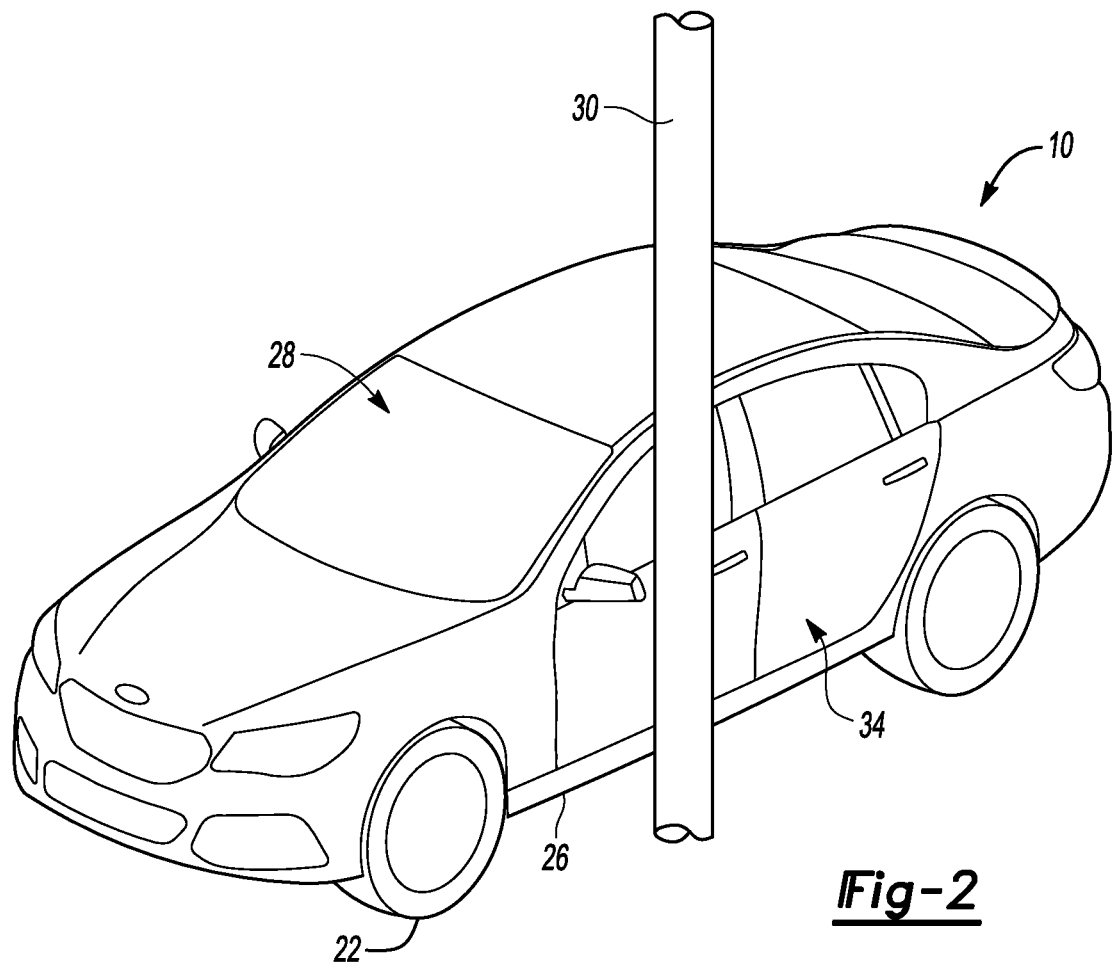
FIG. 2 shows a perspective view of the electrified vehicle of FIG. 1 and a pole.
Figure 3:
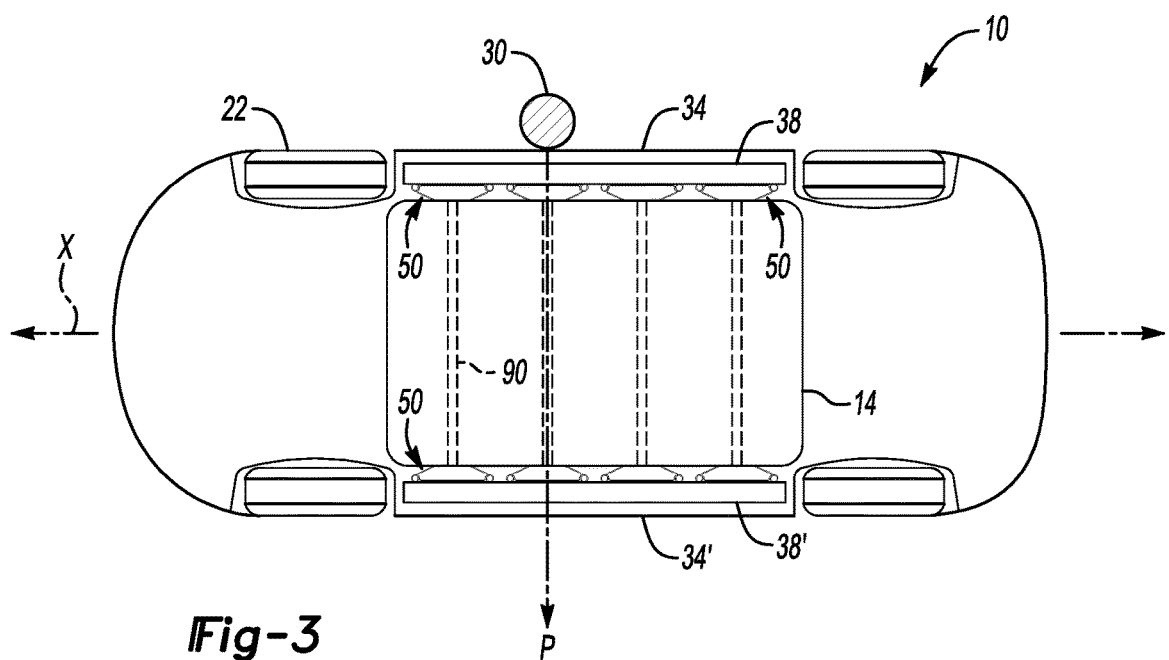
FIG. 3 shows a bottom view of the electrified vehicle of FIG. 2 and the pole.

Referring to FIGS. 1 to 3, an example electrified vehicle 10 includes a battery pack 14 to power an electric machine 18. The vehicle 10 includes wheels 22 driven by the electric machine 18. The electric machine 18 receives electric power from the battery pack 14 and converts the electric power to torque to drive the wheels 22.

The example vehicle 10 is an all-electric vehicle. In other examples, the vehicle 10 is a hybrid electric vehicle, which selectively drives the wheels 22 using an internal combustion engine instead of, or in addition to, the electric machine 18. In hybrid electric examples, the electric machine 18 may selectively operate as a generator to recharge the battery pack 14.

The example battery pack 14 is mounted beneath or adjacent to a floor 26 of the vehicle 10 and below a passenger compartment 28 of the vehicle 10. The example vehicle 10 includes features to absorb applied loads to inhibit the loads from disrupting the battery pack 14 and other components of the vehicle 10.

A type of load applied to the vehicle 10 may be a side impact load. One example of a side impact load includes loads applied to the vehicle 10 when a side of the vehicle 10 contacts a pole 30. To simulate this contact, the vehicle 10 can be moved relative to the pole 30 until the pole 30 contacts a driver side 34 of the vehicle 10.

The example vehicle 10 includes a rocker 38 to help the vehicle 10 absorb loads resulting from contact with the pole 30. The rocker 38 is associated with the driver side 34. Another rocker 38' is associated with a passenger side 34' of the vehicle 10, which is opposite the driver side 34.

Figure 4:
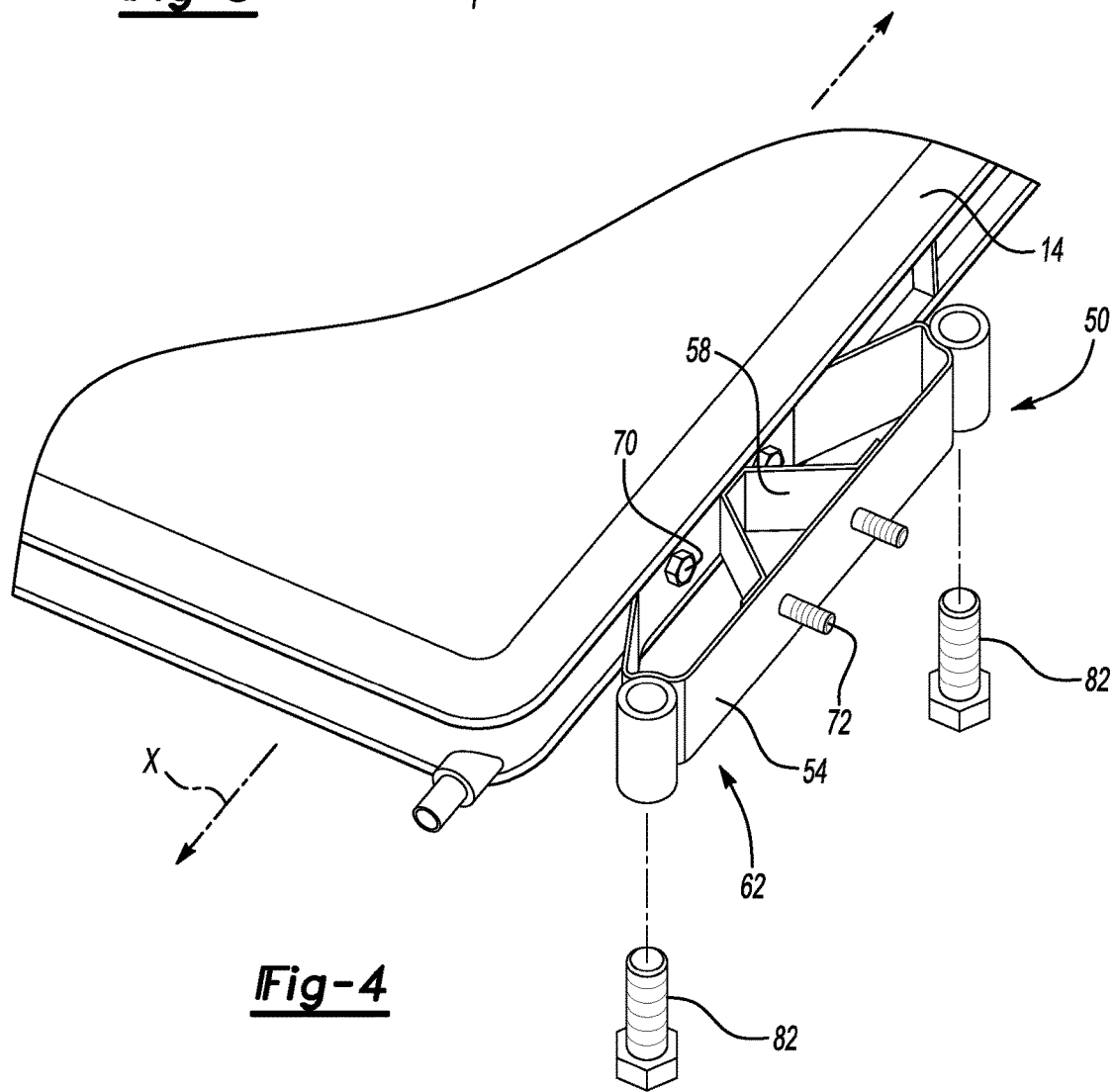
FIG. 4 shows a perspective view of a portion of a battery pack and a support assembly from the electrified vehicle of FIG. 1.
Figure 5:
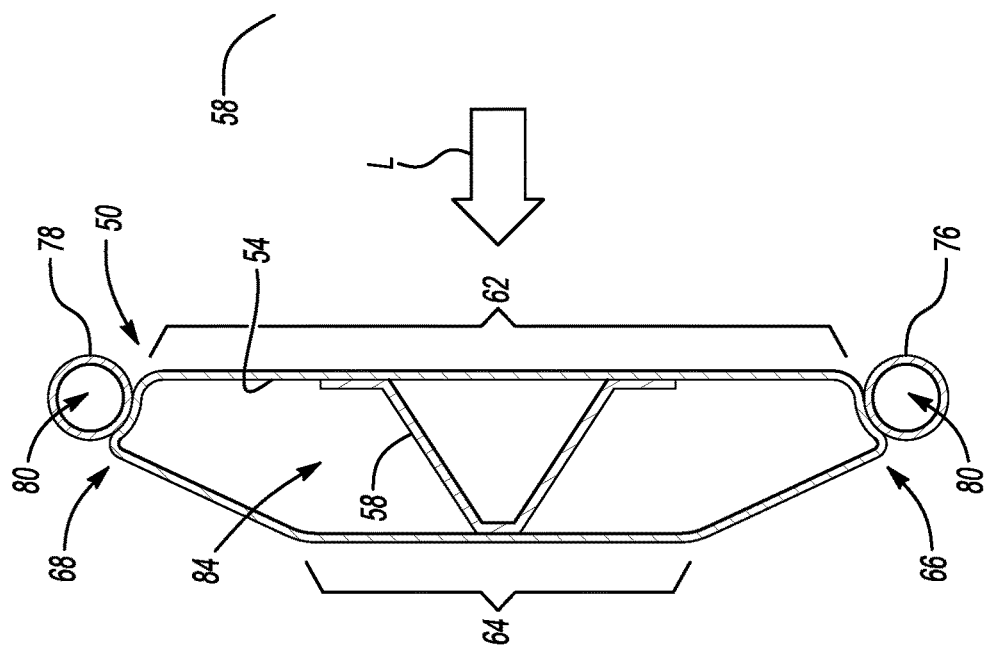
FIG. 5 shows a top view of the support assembly of FIG. 4 prior to an application of a load above a threshold level.

With reference now to FIGS. 4 and 5 with continuing reference to FIG. 3, the vehicle 10 further includes support assemblies 50 that secure the battery pack 14 to the rockers 38, which are a type of vehicle body structure.

In this example, four of the support assemblies 50 are disposed along the driver side 34 of the battery pack 14, and four of the support assemblies 50 are disposed along the passenger side 34' of the battery pack 14. The support assemblies 50 each include a hoop bracket 54 and a tuned bracket 58.

The hoop bracket 54 includes an outboard side 62, an inboard side 64, forward side 66, and a rearward side 68. The inboard side 64 is secured directly to the battery back 14 via, for example, mechanical fasteners 70. The outboard side 62 is secured directly to the rocker 38 via, for example, mechanical fasteners 72.

In the exemplary embodiment, the forward side 66 tapers rearward from the outboard side 62 to the inboard side 64. That is, the point at which the forward side 66 interfaces with the outboard side 62 is further forward relative to a longitudinal axis X of the vehicle 10 than the point at which the forward side 66 interfaces with the inboard side 64.

The rearward side 68 tapers forward from the outboard side 62 to the inboard side 64. That is, the point at which the rearward side 68 interfaces with the outboard side 62 is rearward the point at which the rearward side 68 interfaces with the inboard side 64.

The example support assembly 50 further comprises a forward brace 76 and a rearward brace 78. The braces 76, 78 are cylindrical bushings in this example.

The hoop bracket 54 can be directly secured to the braces 76, 78. For example, the forward side 66 of the hoop bracket 54 can be welded directly to the forward brace 76 and the rearward side 68 of the hoop bracket 54 can be welded directly to the rearward brace 78. Other examples could attach the hoop bracket 54 to the braces 76, 78 in other ways, or leave the braces 76, 78 detached from the hoop bracket 54. In some examples, the braces 76, 78 are omitted.

The braces 76, 78 of the exemplary embodiment provide apertures 80 that receive mechanical fasteners 82 used to secure the braces 76, 78 to the floor 26 of the vehicle 10.

The tuned bracket 58 is disposed within an open area 84 of the hoop bracket 54. The hoop bracket 54 has a cross-section that is polygonal, and that extends circumferentially continuously about an entire periphery of the open area 84 in this example. In another example, the hoop bracket 54 may not extend circumferentially continuously about the entire circumference of the open area 84.

The hoop bracket 54 of the exemplary embodiment extends about the open area 84 relative to a vertically extending axis. Vertical, for purposes of this disclosure, is with reference to the general orientation of the vehicle 10 during operation and with reference to ground or horizon.

The tuned bracket 58 extends from the outboard side 62 of the hoop bracket 54 to the inboard side 64 of the hoop bracket 54. The tuned bracket 58 has a generally triangular cross-sectional profile, as shown in FIG. 5. The tuned bracket 58 can be attached to the outboard side 62 of the hoop bracket 54 via welds. Similarly, the tuned bracket 58 can attach to the inboard side 64 of the hoop bracket 54 via welds. Other examples may rely on mechanical fasteners or another attachment strategy.

During ordinary operation of the vehicle, the support assemblies 50 are configured to support the battery pack 14 and to limit movement of the battery pack 14 relative to the rockers 38 and 38'. The tuned bracket 58, in particular, helps the support assemblies 50 to limit relative vertical movement and relative cross-car movement.

Figure 6:
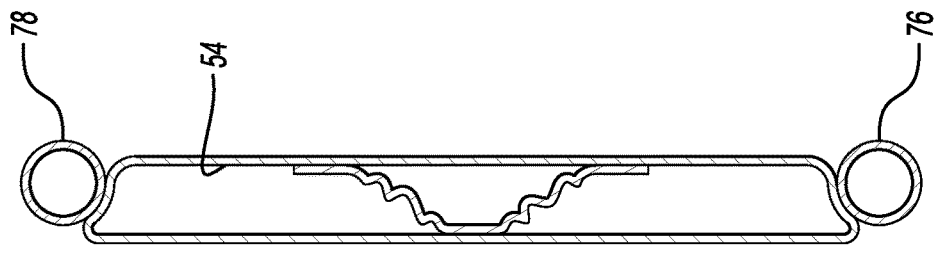
FIG. 6 shows the top view of FIG. 5 after the support assembly has collapsed in response to the load.

As a side impact load L is applied to the vehicle, the tuned bracket 58 controls a collapse of the hoop bracket 54. Controlled collapse, for purposes of this disclosure, means that the hoop bracket 54 does not collapse linearly in response to increasing loads. Instead, the tuned bracket 58 maintains the positioning of the hoop bracket 54 until the load L exceeds a threshold level, say five kilonewtons. When the load L exceeds the threshold value, the tuned bracket 58 yields providing a controlled collapse of the hoop bracket 54 from the position of FIG. 5 to the position of FIG. 6. The controlled collapse of the hoop bracket 54 lessens the load imparted onto the battery pack 14.

The tuned bracket 58 can be tuned to control the collapse of the hoop bracket 54 such that the hoop bracket 54 deforms in a desired vector. The tuned brackets 58 add stiffness to the support assemblies 50, which can help mitigate noise, vibration, and harshness.

As the load L is directed to the support assembly 50 and begins to collapse the tuned bracket 58, the braces 76, 78 brace the forward side 66 and the rearward side 68 to provide deformation of the tuned bracket 58 and the hoop bracket 54 desired areas. That is, the braces 76, 78 can limit shifting of the hoop bracket 54 forward or rearward along the longitudinal axis X of the vehicle 10 when collapsing.

The support assembly 50 is one of several support assemblies disposed along the driver side 34 and passenger side 34' of the battery pack 14. In some examples, the support assemblies 50 are positioned to align with structural cross-members 90 (FIG. 3). The structural cross-members 90 can be positioned, for example, between arrays of battery cells disposed within the battery pack 14. Between is with reference to the longitudinal axis X of the vehicle 10.

Aligning the support assemblies 50, such that one of the support assemblies 50 is aligned with a passenger side end portion of the structural cross-member 90 and another at a driver side end portion of the structural cross-member 90, can facilitate creating a desired load path. The load L from the pole 30 can move along a load path P that extends from one of the support assemblies 50 on the driver side 34, through one of the structural cross-members 90, to one of the support assemblies 50 on the passenger side 34'.

If, for example, the threshold load collapses a support assembly 50 fifty millimeters on one side of the battery pack 14, the arrangement of the structural cross-member 90 and the support assembly 50 on the opposite side of the battery pack 14 can cause the support assembly 50 on the opposite side of the battery pack 14 to also collapse in response to the load L. The collapsing of support assemblies on both the passenger and driver side of the battery pack 14 can result in a collapsible area of one-hundred millimeters. That is, the arrangement of the support assemblies 50 on opposite sides of the structural cross-members 90 can effectively double the potential collapsible area at a given longitudinal area of the battery pack 14.

Figure 7:
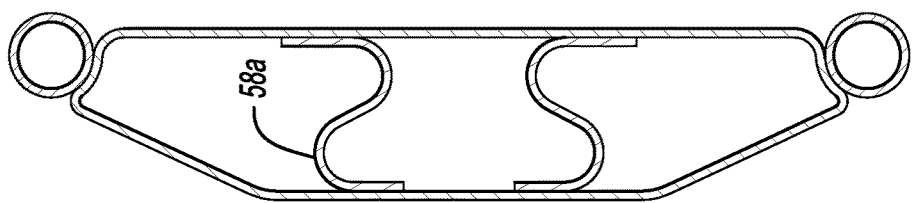
FIG. 7 shows a top view of a support assembly according to another exemplary aspect of the present disclosure.

While the tuned bracket 58 is shown as having a triangular cross-section in this example, other exemplary tuned brackets 58a could have other cross-sections, such as an S-shaped cross-section as shown in FIG. 7.

Although the example hoop bracket 54 is shown as having a cross-sectional profile where the forward side tapers rearward and the rearward side tapers forward to the inboard side 64, other configurations are possible.

Figure 8:
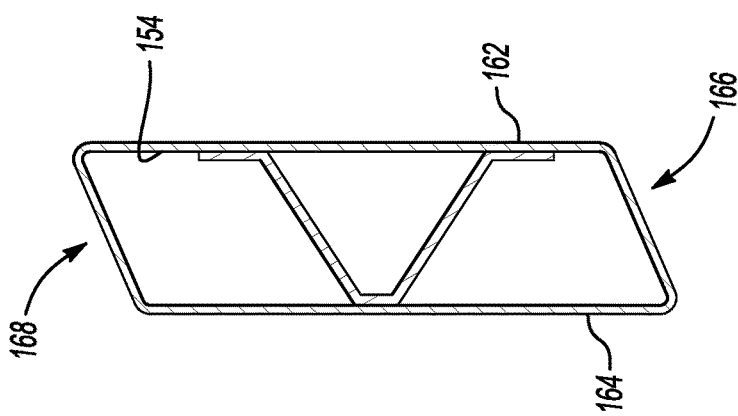
FIG. 8 shows a top view of a support assembly according to another exemplary aspect of the present disclosure.

The hoop bracket 154 of FIG. 8 shows a forward side 166 tapering forward from an outboard side 162 to an inboard side 164. Also, a rearward side 168 of the hoop bracket 154 tapers forward from the outboard side 162 to the inboard side 164.

The bracket of FIG. 8 can encourage some movement of the inboard side 64 relative to the outboard side 62 when a load L is applied. For example, the inboard side 164 can shift along the longitudinal axis X of the vehicle 10 relative to the outboard side 162 as the hoop bracket 54 collapses in response to a load above a threshold value. This redirecting of some portion of the load can provide further protection to the battery pack 14 as some of the load is directed forward or rearward within the vehicle 10 rather than laterally into the battery pack 14.

Another configuration of the hoop bracket could include a forward side that tapers rearward from an outboard side to an inboard side, and a rearward side that also tapers rearward from an outboard side to an inboard side of the hoop bracket.

Some features of the disclosed examples can include a support assembly that collapses so less force is imparted into a battery pack. Side rails, which are sometimes placed between the sides of a battery pack and a rocker, can be bulky, heavy, and take up space. The support assembly of this disclosure can replace some, or all, of the side rails. A similarly sized battery pack can be incorporated into different vehicle packaging environments by changing the support assemblies, which facilitates communization of the battery pack and other vehicle components.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A support assembly, comprising:
    a hoop bracket coupling a battery pack to a vehicle body structure, wherein the hoop bracket extends circumferentially from an outboard side of the hoop bracket to an inboard side of the hoop bracket, the hoop bracket extending circumferentially about a vertically extending axis; and
    a tuned bracket within an open area of the hoop bracket, the tuned bracket configured to control a collapse of the hoop bracket in response to a load above a threshold level to reduce a transfer of the load to the battery pack.

2. The support assembly of claim 1, wherein the tuned bracket extends from the outboard side of the hoop bracket to the inboard side of hoop bracket.

3. The support assembly of claim 2, further comprising a forward side of the hoop bracket that tapers rearward from the outboard side to the inboard side, and a rear side of the hoop bracket that tapers forward from the outboard side to the inboard side.

4. The support assembly of claim 2, further comprising a forward side of the hoop bracket and a rear side of the hoop bracket, the forward and rearward sides both tapering forward from the outboard side to the inboard side or both tapering rearward from the outboard side to the inboard side.

5. The support assembly of claim 2, wherein, with reference to the vertically extending axis, an axial section of the tuned bracket has a triangular profile.

6. The support assembly of claim 1, wherein the hoop bracket extends circumferentially continuously about the open area.

7. The support assembly of claim 1, further comprising a forward brace directly secured to a forward end portion of the hoop bracket, and a rear brace directly secured to a rear end portion of the hoop bracket, the forward and rear braces configured to limit forward and rearward movement of the hoop bracket when the load is applied, wherein the forward brace is configured to receive a first fastener that secures the forward brace, wherein the rear brace is configured to receive a second fastener that secures the rear brace.

8. The support assembly of claim 7, wherein the forward brace and the rear brace are each cylindrical.

9. The support assembly of claim 1, further comprising a vehicle rocker as the vehicle body structure.

10. The support assembly of claim 1, wherein the hoop bracket and the tuned bracket are a first hoop bracket and a first tuned bracket on a driver side of the battery pack, and further comprising a second tuned bracket within an open area of a second hoop bracket on the driver side of the battery pack, the second tuned bracket configured to collapse in response to a load above a threshold level to reduce a transfer of the load to the battery pack, the second tuned bracket and second hoop bracket aft of both the first tuned bracket and the first hoop bracket.

11. The support assembly of claim 10, further comprising the battery pack having a plurality of structural cross-members distributed along a longitudinal axis of a vehicle having the battery pack, one of the structural cross-members extending longitudinally between the first hoop bracket and a third hoop bracket on a passenger side of the battery pack such that a path of the load extends through the first hoop bracket, through the one of the structural cross-members, and through the third hoop bracket.

12. The support assembly of claim 1, wherein the tuned bracket is disposed along a plane aligned with the vertically extending axis.

13. A supporting method, comprising:
coupling a battery pack to a vehicle body structure using a hoop bracket disposed alongside the battery pack, the hoop bracket including an open area that receives a tuned bracket, the tuned bracket configured to control a deformation of the hoop bracket in response to a load above a threshold level to reduce a transfer of the load to the battery pack, wherein the hoop bracket extends circumferentially from an outboard side of the hoop bracket to an inboard side of the hoop bracket, the hoop bracket extending circumferentially about a vertically extending axis.

14. The supporting method of claim 13, wherein the tuned bracket extends from the outboard side of the hoop bracket to the inboard side of hoop bracket.

15. The supporting method of claim 14, wherein the hoop bracket extends circumferentially continuously about the open area.

16. The supporting method of claim 13, wherein the hoop bracket and the tuned bracket are configured such that when the hoop bracket deforms, some of the load is redirected along a longitudinal axis of a vehicle having the battery pack.

17. The supporting method of claim 13, wherein the hoop bracket and the tuned bracket are a first hoop bracket and first tuned bracket on a driver side of the vehicle, the method further comprising coupling the battery pack to another vehicle body structure using a second hoop bracket disposed on a driver side of the battery pack, the second hoop bracket including an open area that receives a second tuned bracket, the second tuned bracket configured to control a deformation of the hoop bracket in response to a load above a threshold level to reduce a transfer of the load to the battery pack.

18. The supporting method of claim 13, wherein the hoop bracket and the tuned bracket are a first hoop bracket and first tuned bracket on a driver side of the vehicle, the method further comprising coupling the battery pack to another vehicle body structure using a second hoop bracket disposed on a driver side of the battery pack, the second hoop bracket including an open area that receives a second tuned bracket, the second tuned bracket configured to control a deformation of the hoop bracket in response to a load above a threshold level to reduce a transfer of the load to the battery pack, the method further comprising applying the load to the driver side of the vehicle to collapse both the first hoop bracket and the second hoop bracket.

19. The supporting method of claim 13, wherein the tuned bracket is disposed along a plane that is aligned with the vertically extending axis.

* * * * *